United States Patent Office 3,285,141
Patented Nov. 15, 1966

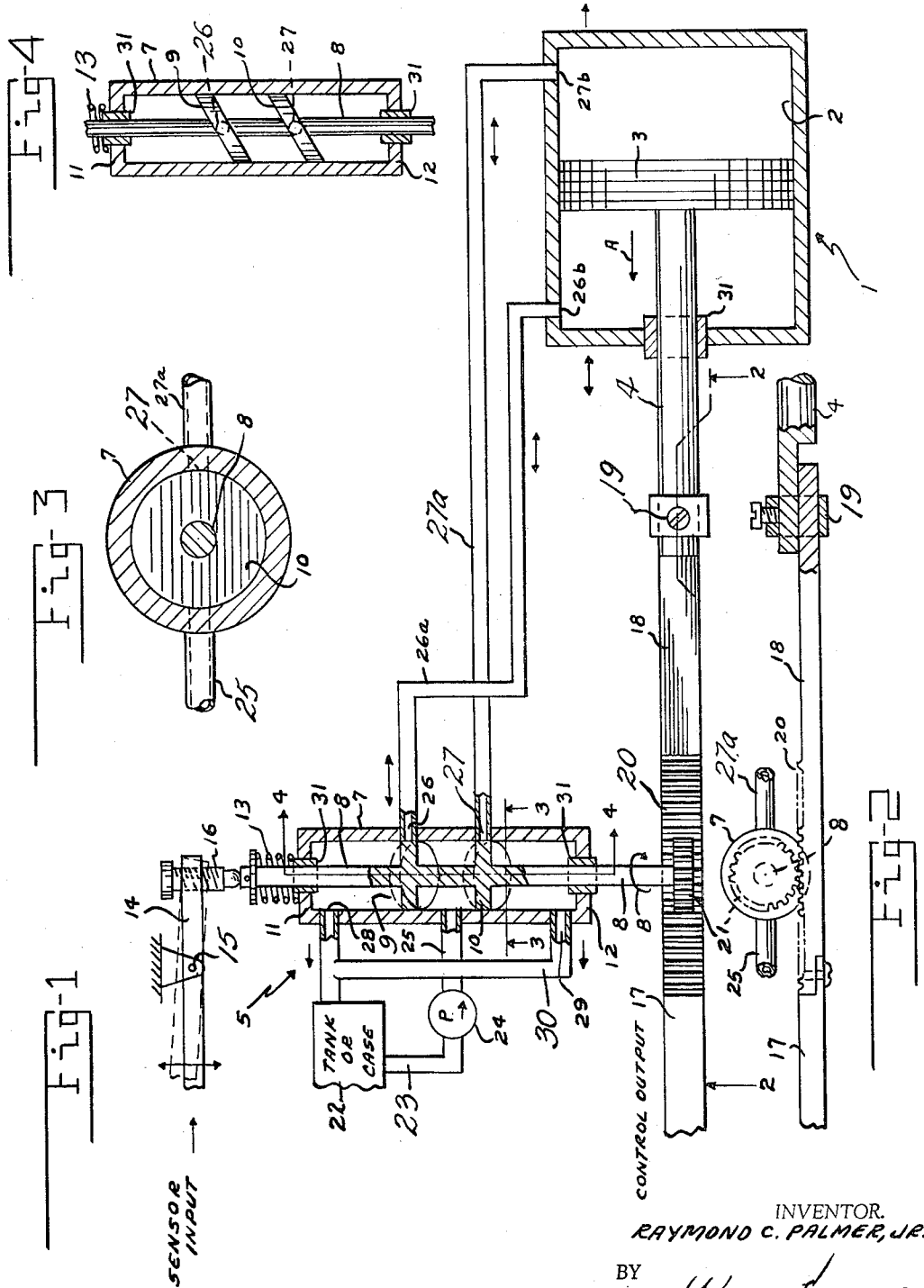

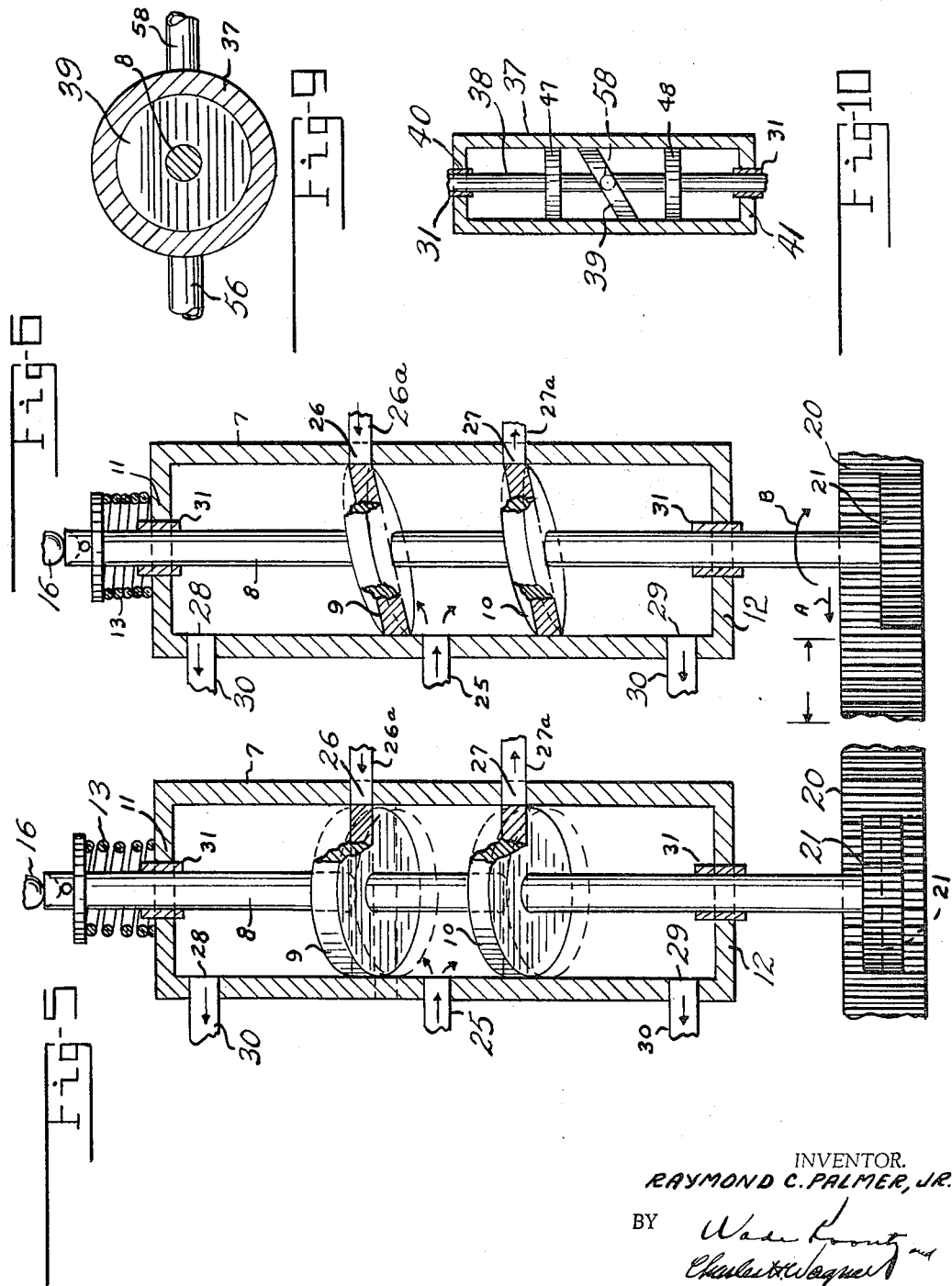

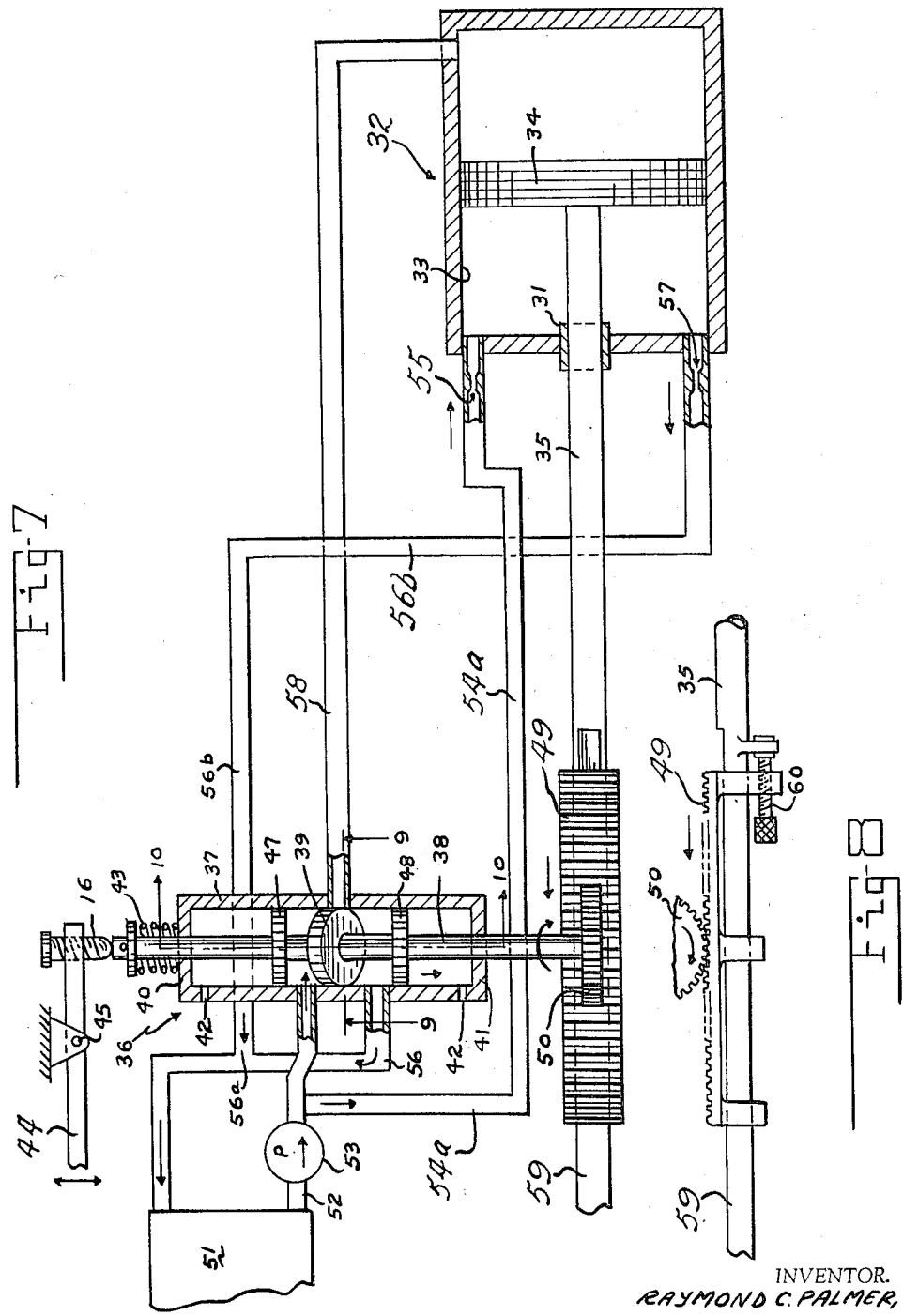

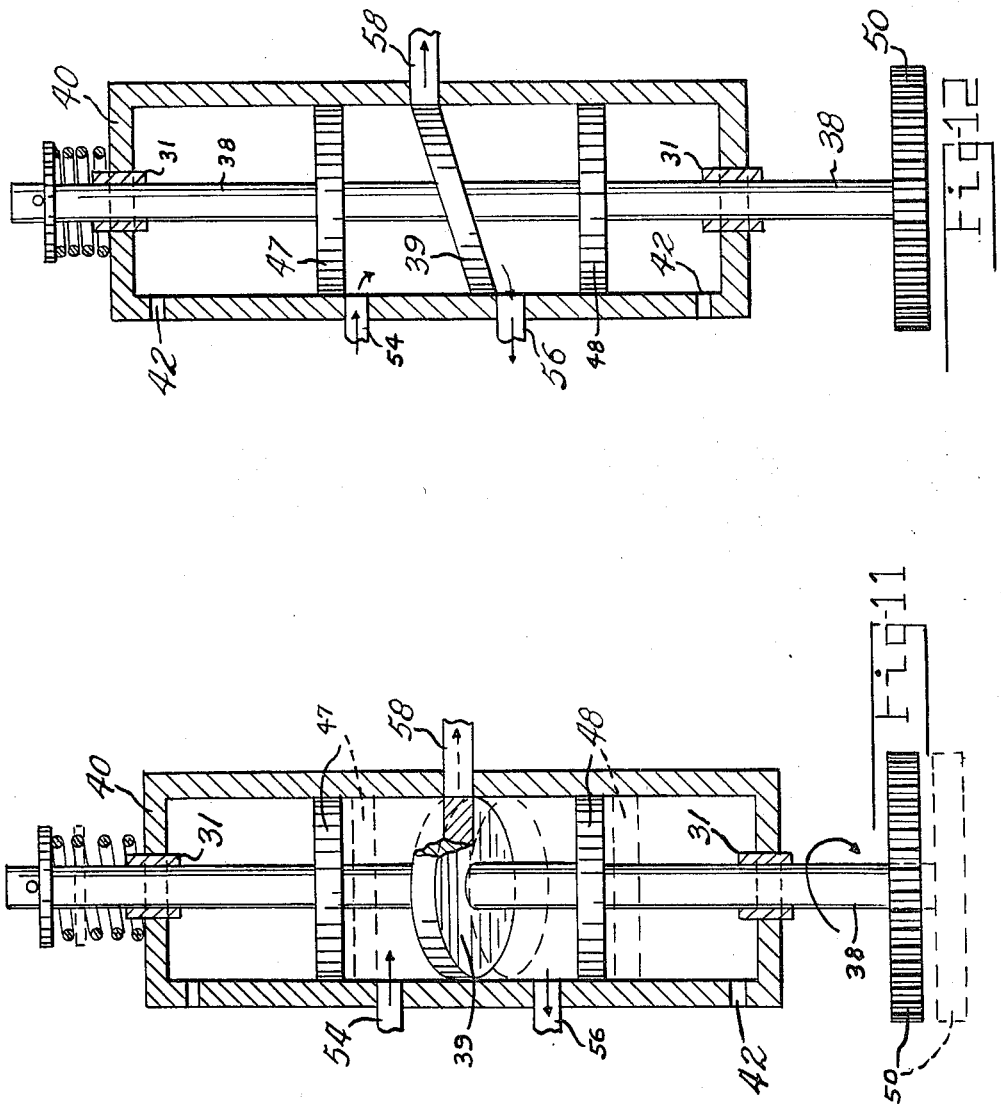

3,285,141
ROTARY NULL PILOT VALVE CONTROLLED DEVICE
Raymond C. Palmer, Jr., Cincinnati, Ohio, assignor to the United States of America as represented by the Secretary of the Air Force
Filed July 7, 1964, Ser. No. 380,964
11 Claims. (Cl. 91—368)

This invention relates to servomotors and control devices, and more particularly to servomotor rotary and axially movable control valves movable axially from a null position to control the amount of movement of a servomotor, including a feedback control from the servomotor to rotate the control valve back to a null position upon predetermined axial movement of the servomotor to relative predetermined positions in response to axial movement of the control valve to predetermined positions, and has for an object the provision of a control system in which the axial movement of the control valve from a null position for actuating the servomotor is very small, compared to the movement of the servomotor in returning the control valve back to its null position.

A further object is the provision of a canted servomotor control valve device having axial and rotative adjustments in which the axial movement from a predetermined null position controls the movement of a servomotor to a relative predetermined control position, and a feedback is provided from the servomotor to the canted control valve whereby predetermined relative axial movement of the servomotor rotates the control valve back to a null position for arresting the movement of the servomotor.

A further object of the invention is the provision of a balanced control valve comprising a cylinder having a conted pressure controlling piston valve therein having a null position covering a pressure fluid discharge port in the cylinder connected to a pressure operated, axially shiftable, servomotor, and axially spaced higher pressure supply and lower pressure relief ports at opposite sides of the canted piston valve, whereby axial movement of the canted control piston valve in one direction from the null position uncovers and connects the higher pressure supply port to the servomotor for shifting the same in one direction, and axial movement of the canted control piston valve from the null position in the opposite direction connects the pressure discharge port to the lower pressure relief port in the cylinder to effect movement of the servomotor in the opposite direction, and includes feedback control means from the servomotor to the canted piston valve for rotating the canted piston valve to a null position to cover the pressure discharge port following relative predetermined axial movement of the canted piston control valve in either axial direction.

A further object of the invention is the provision of a servomotor control device including a cylinder having a pressure discharge port in the wall thereof intermediate the ends thereof, and pressure inlet and outlet ports in the opposite wall thereof in parallel planes at opposite sides of the pressure discharge port, with a canted rotary piston control valve in the cylinder having a null position for closing said pressure discharge port and axially spaced transverse pistons fixed to said canted piston valve at opposite sides thereof for movement therewith between the ends of the cylinder and the respective outlet and inlet ports, for pressure balancing the canted piston valve, together with an axially movable servomotor piston, and cylinder means therefor connected to said pressure discharge port for movement of said piston axially in one direction by pressure from said pressure discharge port, and means for moving said servomotor piston valve in the opposite axial direction, together with feedback control means between said servomotor piston and said canted piston valve for rotating said canted piston valve in one direction to cover said pressure discharge port, by predetermined axial movement of the servomotor piston in one direction relative to predetermined axial movement of said canted piston valve to uncover said discharge port, and rotating said canted piston valve in the opposite direction to cover said pressure discharge port by predetermined relative axial movement of the servomotor piston in the opposite direction following predetermined relative axial movement of the canted piston valve in the opposite direction to uncover said discharge port.

Other objects and advantages of the invention will become apparent from the following description and accompanying drawings in which like reference numerals refer to like parts in the several figures of the drawings.

FIG. 1 is a somewhat diagrammatic plan view of one embodiment of the invention, parts being broken away and shown in section;

FIG. 2 is a fragmentary partial section view taken on line 2—2 of FIG. 1;

FIG. 3 is a cross section on line 3—3 of FIG. 1;

FIG. 4 is a fragmentary sectional view on line 4—4 of FIG. 1;

FIGS. 5 and 6 are fragmentary enlarged sectional views of the canted valve and cylinder structure shown in FIG. 1, dotted lines in FIG. 5 showing canted valve shifted axially to an operative position to actuate servomotor piston, while FIG. 6 illustrates the valve rotated back to null position by axial movement of the servomotor piston, arresting further movement of the servomotor.

FIG. 7 is a somewhat diagrammatic plan view of a modified embodiment of the invention, certain parts being broken away or shown in section, illustrating the canted servomotor control valve in its null position and the servomotor piston in its midposition.

FIG. 8 is a fragmental side elevation of the control actuating rod between the servomotor and the part or device to be controlled showing a zero adjusting or setting means;

FIG. 9 is a cross-sectional view taken about on line 9—9 of FIG. 7;

FIG. 10 is a sectional view taken about on line 10—10 of FIG. 7 looking in the direction of the arrows;

FIGS. 11 and 12 are similar longitudinal sectional views of the canted null valve and its cylinder structure, the dotted lines in FIG. 11 illustrating the null valve shifted axially to a predetermined position for actuation of the servomotor piston to a relative axial position, while FIG. 12 shows the canted null valve rotated through a predetermined angle, as by predetermined responsive axial movement of the servomotor piston, back to a null position.

Referring to FIGS. 1 to 6 of the drawings the reference numeral 1 denotes a servomotor comprising a cylinder 2, having a piston 3 fixed on a control or piston rod 4 while the reference numeral 5 denotes a canted rotary and axially shiftable control or null pilot valve device comprising a valve casing or cylinder 7 having a rotary and axially ajustable valve rod or shaft 8 journalled therein on which are fixed a spaced pair of inclined parallel lands or canted valve pistons 9 and 10. The rod or shaft 8 is suitably rotatably and slidably journalled in and through the opposite ends 11 and 12 of the casing 7, suitable stuffing boxes being provided.

The upper end of the valve rod 8 is tensioned upwardly (as seen in FIG. 1) by a compression coil spring 13 and movement sensing means in the form of a lever 14, pivoted at 15, and having an adjustable abutment 16 which may be provided for axially shifting or adjusting the rod or shaft 8 to selectively control the predetermined range and direction of movement of the servomotor piston 3 in the cylinder 2 for adjusting through the servomotor piston rod 4, the part 17 to be controlled, which part 17 is connected to the rod 18. The rod 18 is longitudinally adjustable at 19 relative to the piston rod 4 to provide for a zero feedback control adjustment. The rod 18 in this form of the disclosure carried a wide rack portion 20 meashing with a pinion gear 21 which is fixed to the outer lower end or extension of the shaft 8, the rack 20 being sufficiently wide to maintain continuous meshing engagement with the pinion 21, while permitting axial adjustment of the shaft 8 and pinion 21.

A suitable fluid container or tank may be provided as indicated at 22, having a conduit 23 leading to a suitable pump 24 having a pressure outlet conduit 25 in communication with the interior of the casing or pilot valve cylinder 7, substantially midway between the two canted piston valves or lands 9 and 10.

Since the pressure fluid from the pump 24 enters the casing 7 between the canted piston valves 9 and 10 this pressure is balanced, as can be noted in FIGS. 1, 5 and 6.

With the pilot valve in its null position, as shown more particularly in FIGS. 1, 4, 5 and 6, the peripheries or lands of the canted pistons or disks 9 and 10 cover and close the two spaced fluid ports 26 and 27 which are respectively in communication with conduits 26a and 27a, respectively in communication with the left and right-hand ends of the servomotor cylinder 2 at 26b and 27b.

The control valve casing or cylinder 7, adjacent the opposite ends 11 and 12 thereof, is formed with fluid return ports 28 and 29 in communication through a common fluid return conduit 30, with the fluid container or tank 22 or it may, if desired, connect with the inlet side of the pump 24. It is understood that suitable parking glands or stuffing boxes which are schematically indicated at 31 will be provided in the servomotor cylinder 2 for the piston rod 4, and in the control valve cylinder 7 for the the control valve rod or shaft 8 to prevent fluid leakage in the system. The pump 24 may be provided with suitable fluid pressure relief by-pass means (not shown) to maintain an appreciable and suitable operating hydraulic pressure to the valve chamber 7 between the canted piston valves 9 and 10 from the pump delivery conduit 25 at all times, while the device is in operation.

Briefly describing the operation, and more particularly referring to FIGS. 4, 5 and 6, and with the servomotor piston 3 (in FIG. 1) in its midposition, when a control signal is received and actuates the movement sensor input device, for instance the lever 14, the lever is rocked to either depress or raise the abutment 16 and shift the control or pilot valve shaft 8 axially up or down in accordance with the control signal received, the upward movement of the shaft 8 being effected by the compression spring 13.

If the movement sensing lever 14 is rocked to shift the shaft 8 downwardly and move the canted valve disks 9 and 10 downwardly to positions shown in dotted lines in FIG. 5, to respectively uncover the two ports 26 and 27 leading to the servomotor cylinder 2 through the conduits 26a and 27a. This will establish direct communication between the pressure supply conduit 25 and the port 27 which through conduit 27a admits pressure into the cylinder 2 at the right-hand side of the piston 3, moving the piston rod 4, rack 20, and part 17 to be controlled to the left.

As seen in FIG. 5 the upper canted valve disk 9 uncovers the port 26 to establish communication between the left-hand end of the servomotor cylinder 2 through conduit 26a and the return conduit 30, returning the fluid at lower pressure at the left of the piston 3 to the tank 22 (or directly to the intake side of the pump 24).

As the servomotor piston 3 moves, the rack 20 rotates the pinion 21 and the valve stem 8, rotating the peripheries of the canted valve disks or lands 9 and 10 to cover and close the fluid ports 26 and 27, trapping the hydraulic fluid in the servomotor cylinder at the opposite sides of the servomotor piston 3, as seen in FIG. 6, thus locking or preventing further actuation of the servomotor 1 until the position of the movement sensing lever 14 changes to move the shaft 8 axially again.

As the servomotor piston rod 4 moves, for instance in the direction of the arrow A, the rack 20 simultaneously rotates the pilot valve shaft 8 clockwise as shown by the arrow B from the dotted position shown in FIG. 5 to the position shown in FIG. 6 where the peripheries of the lands or canted disks 9 and 10 again close the two ports 26 and 27, arresting and locking the servomotor 1 against further movement until the pilot valve shaft 8 is again moved axially by the sensor input means 14. This provides a senstive "follow-up" control in which the degree of axial movement of the pilot valve shaft 8 is very small compared to the movement of the servomotor piston 3 and rod 4 necessary to rotate and restore the canted valve pistons or disks 9 and 10 back to their port closing positions again as seen in FIG. 6. This arrangement provides a large output stroke for a small input stroke with a minimum of mechanical components to gear down the feedback stroke to null the valve 6. The rotative movement of the pilot valve becomes a function of the servomotor stroke, pilot valve diameter, the angular offset of the valve lands, and gear ratio of the feedback.

In the two-land pilot valve configuration (FIGS. 1 to 6) the pilot valve must be "loaded" or attached to the movement sensing input lever 14 and care must be taken in selecting the feedback scheme to assure that force loading by function does not create a "sensor error." The drawings show a rack and pinion in the feedback with intermediate adjusting means 19 (and 60) for adjusting the position of the controlled or actuated part 17 (or 59) relative to the desired position of the sensor input means (lever 14). Other feedback means are also contemplated and may be provided for rotating the pilot valve back to its null position simultaneously with the predetermined movement of the servomotor piston 3.

Referring to the modified embodiment shown in FIGS. 7 to 12 in which a single canted land pilot valve is provided also having combined axial and rotative adjustment, the reference numeral 32 denotes a servomotor comprising a cylinder 33 having a piston 34 fixed on a piston rod 35, while the reference numeral 36 denotes a rotary and axially shiftable control or null pilot valve structure comprising a valve casing 37 having a rotary and axially adjustable valve rod or shaft 38 therein on which is fixed a single inclined land or canted valve disk or piston 39, the rod 38 being suitably rotatable and axially slidable journalled in and through the opposite ends 40 and 41 of the casing 37, suitable vents 42 being provided adjacent the ends 40 and 41.

The upper end of the rod 38 is tensioned upwardly as seen in FIG. 7 by a compression coil spring 43 and movement sensing control means such as the lever 44 pivoted at 45, having the adjustable abutment 46, as shown is identical to the abutment 16 in FIG. 1. Predetermined degrees of rocking of the movement sensing lever 44 shifts the pilot valve shaft 38 axially to selectively control the range of movement of the piston 34 in the servo-motor cylinder 33 (and, of course, the controlled part 59).

The pilot valve rod 38 carries a spaced pair of parallel transverse disk-like pistons 47 and 48, one on each side of the canted valve disk or land 39.

The servomotor piston rod 35 carries a longitudinally adjustable rack 49 which meshes with a pinion gear 50, the rack 49 being sufficiently wide to maintain meshing engagement with the pinion 50 while permitting axial or longitudinal adjustment of the shaft 38 by the sensing means 44.

A suitable fluid container or tank 51 is provided, having a fluid delivery conduit 52 leading to a power operated pump 53 having a fluid pressure outlet conduit 54 in communication with the interior of the casing 37, substantially midway between the canted vane or disk valve 39 and the upper piston or disk 47.

The conduit 54 has a bypass conduit 54a which leads into the left-hand end of the servomotor cylinder 33, a constriction or restriction 55 being formed in the conduit 54a to restrict the rate of flow from the pump 53 into the left-hand end of the cylinder 33.

A pressure return conduit 56 leads from the space within the cylinder 37 between the canted vane or disk 39 and the transverse disk or piston 48, discharging into the tank 51, and is connected at 56a to a conduit 56b in communication with the same end of the servomotor cylinder 33 that the conduit 54a is connected to, this conduit 56b also carrying a restriction 57 therein.

This arrangement provides a pressure in the cylinder 33 on the left side of the piston 34 at all times which is lower than the delivery pressure in conduit 54 from the pump 53, the ratio between this lower presure and pump pressure depending upon the size of the restrictions 55 and 57.

A pressure delivery and fluid return conduit 58 connects the right-hand end of the servomotor cylinder 33 with the central portion of the pilot valve casing 37 and is positioned, as seen in FIGS. 7, 10, 11 and 12 to be closed by the periphery of the canted valve 39 when the canted valve is moved to the null position.

The operation of the embodiment just described is similar to that shown in FIGS. 1 to 7. When the pilot valve shaft 38 is depressed axially, for instance from full to dotted line position as seen in FIG. 11, the conduit 58 is uncovered and pressure fluid from the pump 53 is delivered through conduit 58 to the right-hand end of servomotor 32 forcing the piston rod 35 to the left. Since the recirculating pressure fluid through pipes 54a and 56b provides lower pressure than the direct pump pressure through the pilot valve 36, the piston 34 in the servomotor 32 will move to the left, shifting the rack 49 and the part or element to be controlled which is connected thereto. Shifting of the rack 49 by the piston rod 35 rotates the pinion 50, rotating the canted disk valve 39 from the position shown in dotted lines in FIG. 11 to the position in FIG. 12, causing the rim of the valve 39 to again close the passage 58 and arrest the movement of the servomotor piston rod 35 and the part 59 being controlled at a predetermined relative position corresponding to the axial displacement of the pilot valve shaft by the movement sensing lever 14.

An adjustment is provided for "zeroing in" the desired position of the controlled element or part 59 relative to the position of the sensing element 44 comprising a thumbscrew adjustment 60 for adjusting the position of the rack 49 on the rod 35 and thus rotatably adjusting the position of the rim of the canted pilot valve 39 relative to the location of the opening in the wall of the cylinder into the conduit 58.

If the pilot valve 39 is adjusted upwardly by the spring 43 under control of 44 to establish communication between conduit 58 and the unobstructed pressure fluid return conduit 56 to the tank 51, the pressure in the left-hand end of the cylinder 33 will exceed that in the right-hand end and move the piston to the right, rotating the pinion 50, shaft 38, and canted valve disk 39 back to its null position, closing the port conduit 58 and arresting movement of the servo piston 34 at some predetermined point proportional to the axial displacement of the pilot valve 39 by the sensing device 44.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention, as defined in the accompanying claims.

I claim:

1. A servomotor control device comprising a closed elongated cylindrical pilot valve casing having a pressure fluid delivery port in the side wall thereof intermediate the opposite ends thereof, a canted pilot valve disk rotatably and axially adjustable in said casing having a port closure rim in sliding contact with the inner wall of the casing, said canted valve disk having a null position covering and closing said delivery port, means exteriorly of said casing operatively connected to said canted valve disk for adjusting the same axially to predetermined positions in said casing to uncover and open said delivery port conduit means from said delivery port, adapted to connect the interior of the one end of a servomotor cylinder having a piston therein, a second fluid port in the wall of said casing displaced axially beyond the portion traversed by said rim, said second port being adapted to be connected to a source of fluid under pressure, valve actuating means adapted to connect the servomotor piston to said canted valve disk for rotating said canted valve disk in its canted position on the central axis of said casing to bring a predetermined different portion of said closure rim over the first mentioned port to cover and close the same, following predetermined axial adjustment of said canted valve disk in said casing by predetermined relatively greater axial movement of the servomotor piston, whereby to close said conduit to the servomotor cylinder.

2. A control device as set forth in claim 1 including adjustment means for adjusting the rotating position of the canted valve disk independently of the axial position of the canted valve disk in the casing or movement thereof by said servomotor piston.

3. A servomotor and controlling pilot valve thereof comprising, a servomotor cylinder, a piston axially movable in said cylinder, a piston rod connected to said piston for actuation by said piston of a movable part to be controlled, a pilot valve cylinder, a pilot valve shaft concentrically journalled in said pilot valve cylinder for axial and rotative adjustments, movement sensing means engaging said shaft for controlling axial adjustments thereof to relative predetermined positions, an operating connection between said servomotor piston rod and said shaft for rotatably adjusting said shaft about its axis in one direction to predetermined positions incident to predetermined axial movements of said piston rod in one direction and to predetermined rotative positions in the opposite direction incident to predetermined axial movements of said piston rod in the opposite direction, said pilot valve cylinder having a fluid pressure outlet port in the wall thereof intermediate its ends connected to one end of said servomotor cylinder for delivering a fluid under pressure therethrough for moving said servomotor piston in one direction, a canted pilot valve disk fixed on said shaft in inclined relation to the axis thereof having a periphery normally covering and closing said outlet port when in a null position and movably axially by said shaft to uncover and open said outlet port and rotatable to said null position by said piston rod to again cover and close said port to said servomotor cylinder, said pilot valve cylinder having a pressure fluid inlet in the wall thereof intermediate its ends in axially spaced relation to one side of said canted pilot valve disk for introducing fluid under pressure into said pilot valve cylinder, said pilot valve cylinder having a fluid return port in the wall thereof in axially spaced relation to the opposite side of said inclined pilot valve disk in communication with the opposite end of said servomotor cylinder and means for supplying a pressure fluid to the other end of said servomotor cylinder at a lower pressure than the pressure supplied to said pilot valve cylinder through said pressure fluid inlet.

4. A pilot valve construction comprising in combination, a casing having a cylindrical chamber with a pressure fluid inlet port in the wall thereof intermediate its ends for the passage of hydraulic fluid into said casing under pressure, said casing having fluid inlet and outlet ports in the wall thereof in axially spaced relation from the first mentioned inlet port at opposite sides thereof, one of said inlet and outlet ports adapted to connect one end of a servomotor cylinder and the other inlet and outlet port adapted to connect the opposite end of the servomotor cylinder having a piston therein on a piston rod, adapted to be connected to a part to be controlled, said cylindrical chamber having fluid discharge ports therein adjacent the opposite ends thereof, a pilot valve shaft axially shiftable and rotatably journalled concentrically in said cylindrical chamber, movement sensing means for controlling predetermined axial movement of said shaft in opposite directions, means carried by said shaft and adapted to be connected to the piston rod for rotating said shaft about its axis to predetermined positions in one direction incident to predetermined greater axial movement of said piston rod, to relative predetermined positions in one direction, and rotating said shaft in the opposite direction to predetermined relative positions incident to predetermined greater movement of said piston rod to relative predetermined positions in the opposite direction, a pair of axially spaced inclined parallel pilot valve port closure disks fixed on said shaft having a null position with the peripheries of the disks covering and closing both of said inlet and oulet ports, with the pressure fluid inlet in the wall disposed between the adjacent faces of the inclined valve disks, whereby axial movement of the shaft in either direction from a null position displaces the peripheries of the two inclined disks to uncover and open the two fluid inlet and outlet ports to establish communication between the pressure fluid inlet and one of said fluid inlet and outlet ports, and establish communication between the other fluid inlet and outlet port and one of the discharge ports, and rotative movement of said shaft incident predetermined relative axial movement of the piston rod rotates said inclined valve disks to again cover and close said fluid inlet and outlet ports for arresting further movement of said piston rod and trapping pressure fluid in both ends of said servomotor cylinder.

5. A pilot valve and servomotor combination comprising, a cylindrical pilot valve chamber having a pressure fluid inlet port in the wall thereof intermediate the ends thereof, a pilot valve shaft axially slidable and rotatably adjustable concentrically in said chamber, a pair of spaced parallel inclined pilot valve disks fixed on said shaft with the peripheries thereof traversing the inner wall of said chamber at opposite sides of said pressure fluid inlet port, said chamber having longitudinally spaced inlet and outlet fluid openings in the wall thereof adapted to be simultaneously covered and closed by the peripheries of said inclined valve disks when said disks are in predetermined null positions, said chamber having a fluid outlet opening therein between each end and each of the inclined valve disks, whereby predetermined axial adjustment of said shaft moves said disks to simultaneously uncover both of said longitudinally spaced inlet and outlet openings to establish fluid communication between one of said inlet and outlet openings and said pressure fluid inlet port and simultaneously establish communication between the other of said inlet and outlet fluid openings and one of said fluid outlet openings in the ends of the chamber, and a servomotor cylinder connected at one end in communication with one of said fluid inlet and outlet ports and at its opposite end with the other fluid inlet and outlet port, a piston movable axially in said cylinder, an operating connection between said piston and said shaft for rotating said shaft through a predetermined arc to predetermined null positions in one direction by predetermined relative axial movement of said piston in one direction and rotating said shaft through a predetermined arc to predetermined null position in the opposite direction by predetermined axial movement of said piston to predetermined position in the opposite direction, whereby to bring the peripheral portions of said inclined pilot valve disks into null positions covering and closing said inlet and outlet ports incident to predetermined movement of said piston in said servomotor cylinder in either direction.

6. In a servomotor controlling pilot valve, a servomotor comprising a cylinder and a piston therein fixed on a piston rod movable axially in said cylinder by said piston, a pilot valve cylinder, a pilot valve shaft concentrically journalled in said cylinder for axial and rotative adjustments in opposite directions, canted pilot valve disk means fixed on said shaft in inclined relation to the axis of the shaft, having a periphery traversing the inner surface of the cylinder, said cylinder having a fluid pressure inlet port in the wall thereof located at one side of the inclined valve disk means and a fluid pressure outlet port in said wall in axially spaced relation to the inlet port at the opposite side of said inclined pilot valve disk means, said cylinder having a fluid port in the wall thereof in a transverse plane through said cylinder intermediate transverse planes through said inlet and outlet ports, disposed to be covered and closed by the periphery of the inclined valve disk when said shaft is in a predetermined null position, movement sensing means operatively connected to said shaft for shifting the shaft axially to predetermined positions in one direction to uncover and open said fluid port and establish communication between said fluid port and said fluid inlet port, and shifting by said shaft axially in the opposite direction to uncover said inlet port and establish communication between said fluid port and said fluid outlet port, a pressure fluid conduit between said fluid port and one end of the servomotor cylinder, fluid pressure supply means, a fluid source therefor connected to said fluid pressure inlet port for supplying fluid under a predetermined pressure through said inlet port into said pilot valve cylinder, means connected in communication with the opposite end of said servomotor cylinder for supplying a predetermined lower pressure thereinto, actuating means connected between said servomotor piston rod and said shaft for rotating said shaft through predetermined arcs incident to predetermined axial movement of said piston rod, following predetermined axial movements of said shaft by said sensing means, to rotate the periphery of said canted valve disk back to null position to cover and close said fluid port and arrest further movement of said piston in said servomotor cylinder.

7. Apparatus as set forth in claim 6 including a pair of axially spaced transverse piston disks fixed on said shaft normal to the axis of said shaft at opposite sides of said inclined pilot valve disk, one of said transverse piston disks traversing the inner surface of said pilot valve cylinder between the fluid inlet port and one end of the pilot valve cylinder and the other transverse piston disk traversing the said inner surface of said pilot valve cylinder between the pressure fluid outlet port and the other end of the cylinder, said pilot valve cylinder having venting outlets in the ends thereof, between the transverse piston disks and the ends of the pilot valve cylinder.

8. In a servomotor and pilot valve control assembly, a servomotor comprising a closed cylinder having a piston therein, a piston rod fixed to said piston for axial movement in said cylinder, and adapted to be operatively connected to adjust the position of a part to be controlled, a closed pilot valve cylinder, a pilot valve shaft journalled in said pilot valve cylinder for axial and rotative adjustments, shiftable movement sensing control means operatively connected to said shaft for controlling predetermined relative axial movements of said shaft from a null position in either direction, a pair of axially spaced parallel canted piston disks fixed on said shaft in materially inclined relation to the axis of said shaft and the pilot valve cylinder axis, said pilot valve cylinder having a fluid pressure inlet port in the wall thereof intermediate the adjacent sides of said canted piston disks and the surface of the pilot valve cylinder traversed by said inclined piston disks, said pilot valve cylinder having spaced pressure fluid return ports in said wall between the inclined piston disks and the ends of the cylinder, said pilot valve cylinder having a first fluid delivery and return port in the wall disposed to be covered and closed by the periphery of one of said inclined piston disks and a second fluid delivery and return port in said wall disposed to be simultaneously covered and closed by the periphery of the other inclined piston disk, a fluid delivery and return conduit connected between one of said fluid delivery and return ports and one end of said servomotor cylinder, and a second fluid delivery and return conduit connected between the other end of said servomotor cylinder and the other fluid delivery and return port, actuating means operable between said piston rod and said shaft for rotating said shaft through predetermined angles proportional to predetermined axial movements of said servomotor piston rod to move said inclined piston valve peripheries through relative predetermined arcs to cover and close both of said fluid delivery and return ports following predetermined axial movement of said shaft by predetermined movement of said movement sensing control means.

9. In a servomotor and pilot valve control assembly, a servomotor comprising a closed cylinder having a piston therein, a piston rod fixed to said piston for axial movement in said cylinder, adapted to be operatively connected for moving a part to be controlled, a closed pilot valve cylinder, a piston rod journalled in said pilot valve cylinder for axial and rotative adjustments, shiftable movement sensing means operatively connected to said shaft for controlling predetermined axial movement of said shaft from a null position in either direction, a pair of axially spaced piston disks fixed on said shaft in inclined relation to the axis of said shaft and pilot valve cylinder and parallel to each other, said last mentioned cylinder having a fluid pressure inlet port in the wall thereof intermediate the inner surfaces thereof which is traversed by said inclined piston disks, and fluid return ports in said wall between the inclined piston disks and the ends of the cylinder, said last cylinder having a fluid supply port in the wall disposed to be covered and closed by the periphery of one of said inclined piston disks and a fluid return port in said wall disposed to be covered and closed by the periphery of the other inclined piston disks, a fluid pressure supply conduit between said fluid supply port and one end of said servomotor cylinder, and a fluid return conduit between the other end of said servomotor cylinder and the fluid return port, means operable between said piston rod and said shaft for rotating said shaft through predetermined angles proportional to predetermined movements of said servomotor piston rod, for returning said inclined piston valve peripheries to cover and close said fluid pressure supply and fluid pressure return ports following predetermined axial movement of said shaft by said movement sensing control means for simultaneously uncovering said fluid pressure supply and said fluid pressure return port.

10. In a servomotor and control device therefor, a servomotor cylinder, a piston axially movable in said cylinder, a piston rod fixed to said piston and extending out of said servomotor cylinder adapted to be connected to a part to be controlled, a pilot valve cylinder, a pilot valve shaft concentrically journalled in said pilot valve cylinder for axial and rotative adjustments, a canted pilot valve disk fixed on said shaft for axial and rotative adjustments within said pilot valve cylinder, movement sensing means for adjusting the shaft axially to predetermined positions responsive to predetermined relative movements of said sensing means, said pilot valve cylinder having a fluid inlet port in the wall thereof at one side of said canted valve disk adapted to be connected to a source of fluid under pressure, said pilot valve cylinder having a fluid return port in the wall thereof in spaced relation to the inlet port at the opposite side of said canted valve disk, adapted to be connected for returning fluid from said pilot valve cylinder to said fluid source, said pilot valve cylinder having a fluid inlet and outlet port in the wall thereof intermediate the aforesaid inlet port and outlet port, disposed to be covered and closed by the periphery or rim of the canted valve disk when the disk is shifted axially and/or rotated to predetermined null positions, in which said fluid inlet and outlet port is connected in communication with one end of said servomotor cylinder, means adapted to be connected to said source of fluid under pressure for supplying fluid into the opposite end of said servomotor cylinder at a lower pressure, said pilot valve shaft having a pinion fixed thereon for rotatively adjusting the said canted valve disk in said pilot valve cylinder, a rack member meshing with said pinion for rotative adjustment of said pilot valve disk, an operating connection fixed between said servomotor piston rod and said rack for rotating said pinion and shaft to predetermined positions in opposite directions by axial movement of said servomotor piston rod to predetermined positions in opposite directions, and means for adjusting the rotative position of said pilot valve shaft relative to the axial position of said servomotor piston rod.

11. In a device of the class described, a movable member to be controlled, axially and rotatably shiftable control means therefor shiftable axially in one direction from a null position for controlling the movement of said member in one direction and rotatable about its axis in one direction back to a null position, and axially shiftable in the opposite direction for controlling movement of said member in another direction, and rotatable about its axis in the opposite direction to a null position, and feedback actuating means from said member to said control means for rotating said control means about its axis back to a null position in one direction by predetermined movement of said member in one direction for arresting relative movement of said member in said first mentioned direction, and rotating said control means about its axis in the opposite direction to a null position by predetermined movement of said member in the other direction for arresting movement of said member in said second mentioned direction, the degree of movement of said member in rotating said control means back to its relative null position following axial movement thereof is considerably greater than the relative axial movement of said control means for causing the relative movement of said movable member, in which said control means comprises a pilot valve cylinder having an inclined pilot valve disk movable axially therein from a null position to uncover a fluid pressure delivery port and rotatable about its axis from the last mentioned position uncovering the port back to a null position again covering the port.

References Cited by the Examiner

UNITED STATES PATENTS

| 786,652 | 4/1905 | Larsson | 91—380 |
| 1,908,396 | 5/1933 | Albright | 137—625.69 |
| 2,311,010 | 2/1943 | Vickers | 91—368 |
| 3,146,795 | 9/1964 | Retallick | 137—625.17 |

MARTIN P. SCHWADRON, *Primary Examiner.*

PAUL E. MASLOUSKY, *Examiner.*